United States Patent
Smith et al.

(10) Patent No.: US 11,854,064 B2
(45) Date of Patent: Dec. 26, 2023

(54) SYSTEM AND METHOD FOR ADDING ITEMS TO AN ELECTRONIC ORDER

(71) Applicant: Walmart Apollo, LLC, Bentonville, AR (US)

(72) Inventors: Austin Smith, San Jose, CA (US); Arnon Katz, San Mateo, CA (US); Michael Ebener, San Francisco, CA (US); Vidyanand Krishnan, Sunnyvale, CA (US); Jason Shaffer, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 40 days.

(21) Appl. No.: 17/107,737

(22) Filed: Nov. 30, 2020

(65) Prior Publication Data
US 2021/0082032 A1    Mar. 18, 2021

Related U.S. Application Data

(63) Continuation of application No. 15/444,977, filed on Feb. 28, 2017, now Pat. No. 10,853,871.

(51) Int. Cl.
*G06Q 30/0601*    (2023.01)
*G06Q 10/087*    (2023.01)
*G06Q 30/016*    (2023.01)

(52) U.S. Cl.
CPC ....... *G06Q 30/0635* (2013.01); *G06Q 10/087* (2013.01); *G06Q 30/016* (2013.01)

(58) Field of Classification Search
CPC . G06Q 30/0601–0645; G06Q 30/0635; G06Q 30/016; G06Q 10/087

(Continued)

(56) References Cited

U.S. PATENT DOCUMENTS 6,539,386 B1    3/2003    Athavale et al.
6,618,668 B1    9/2003    Laird
(Continued)

FOREIGN PATENT DOCUMENTS

AU    2016244286 A1 * 11/2016    ......... G06Q 30/0253

OTHER PUBLICATIONS

Seetharaman, Deepa. "Amazon Has Installed 15,000 Warehouse Robots To Deal With Increased Holiday Demand" BusinessInsider. com (Year: 2014).*

(Continued)

*Primary Examiner* — Allison G Wood
*Assistant Examiner* — Katherine A Barlow
(74) *Attorney, Agent, or Firm* — BRYAN CAVE LEIGHTON PAISNER LLP

(57) ABSTRACT

A system includes one or more processors and one or more non-transitory computer-readable media storing computing instructions configured to run on the one or more processors to perform: receiving, from a customer device, an online order for a customer, wherein the online order comprises a customer identification for the customer; receiving, from the customer device, a selection of a pick-up time for retrieval at a store; receiving an additional order for the customer; linking the additional order to the online order based on the customer identification; sending instructions to an assembler configured to (1) read identifiers of the online order and the additional order, (2) retrieve the plurality of items and the one or more additional items from a facility, and (3) place the plurality of items and the one or more additional items in a designated location. Other embodiments are disclosed.

20 Claims, 10 Drawing Sheets

(58) Field of Classification Search
USPC .................................. 705/26.1–27.2, 26.81
See application file for complete search history.

(56) References Cited

U.S. PATENT DOCUMENTS

| | | | |
|---|---|---|---|
| 6,975,998 | B1 | 12/2005 | Jones |
| 7,558,747 | B2 | 7/2009 | Javangula et al. |
| 7,561,069 | B2 | 7/2009 | Horstemeyer |
| 7,716,086 | B2 | 5/2010 | Anderson et al. |
| 7,895,199 | B2 | 2/2011 | Baeza et al. |
| 8,204,799 | B1 * | 6/2012 | Murray ............... G06Q 30/0635 705/26.81 |
| 8,428,620 | B2 | 4/2013 | Sweeney et al. |
| 8,793,262 | B2 | 7/2014 | Addala et al. |
| 9,131,343 | B2 | 9/2015 | Kandekar et al. |
| 9,269,075 | B2 | 2/2016 | Addala et al. |
| 10,043,149 | B1 * | 8/2018 | Iacono .................... G07F 17/40 |
| 2003/0115104 | A1 | 6/2003 | Smith et al. |
| 2003/0135428 | A1 | 7/2003 | Smith |
| 2004/0044467 | A1 | 3/2004 | Laird |
| 2004/0065053 | A1 * | 4/2004 | Rice ..................... G06Q 10/087 53/445 |
| 2004/0122749 | A1 | 6/2004 | Wei |
| 2004/0210621 | A1 | 10/2004 | Antonellis |
| 2008/0105495 | A1 | 5/2008 | Mazzoni et al. |
| 2011/0258134 | A1 | 10/2011 | Mendez |
| 2016/0063604 | A1 | 3/2016 | Shaffer et al. |
| 2016/0098669 | A9 | 4/2016 | Kantarjiev et al. |
| 2016/0104112 | A1 | 4/2016 | Gorlin |
| 2016/0171592 | A1 | 6/2016 | Pugh et al. |
| 2016/0225046 | A1 * | 8/2016 | Chang ............... G06Q 30/0605 |
| 2016/0247113 | A1 | 8/2016 | Rademaker |
| 2016/0300291 | A1 * | 10/2016 | Carmeli ............ G06Q 30/0635 |
| 2016/0304281 | A1 * | 10/2016 | Elazary ................ B65G 1/0492 |
| 2016/0314429 | A1 | 10/2016 | Gillen et al. |

OTHER PUBLICATIONS

Sawers, Paul. "Grocery giant demos robotic arm that can pick and pack delicate items such as fruit" VentureBeat.com (Year: 2017).*

Kim, Eugene. "Amazon's $775 million deal for robotics company Kiva is starting to look really smart" BusinessInsider.com (Year: 2016).*

Kline, Daniel. "3 Ways Amazon Is Making Shopping Easy (and Why That Hurts Wal-Mart)" The Motley Fool. Fool.com (Year: 2016).*

Reuters "Wal-Mart's next move against Amazon: More warehouses, faster shipping" CNBC.com (Year: 2016).*

Liang, C., et al. "Automated Robot Picking System for E-Commerce Fulfillment Warehouse Application" The 14th IFToMM World Congress, Taipei, Taiwan, Oct. 25-30, 2015. doi: 10.6567/IFToMM.14TH.WC.OS13.077 (Year: 2015).*

System and Method to Optimize Food/Goods Delivery With Usage Personalization. ip.com Prior Art Database Technical Disclosure, Jan. 2, 2003, https://priorart.ip.com/IPCOM/000261672 (Year: 2003) Jan. 2, 2003.

IP.com, "Method and Apparatus for Online Shopping with In Store Pickup and Payment," An IP.com Prior Art Database Technical Disclosure, Jan. 2, 2003, https://priorart.ip.com/IPCOM000010644D, 2003. 2003.

Lucena, Fabio Fernando Moreno. An Open Source BI Approach: Concept Proof Tracking Fleet. Instituto Politecnico do Porto (Portugal) ProQuest Dissertations Publishing, 2015. (Year: 2015) 2015.

Rahman, Md Mahbubar. Two-Echelon Vehicle Routing Problems Using Unmanned Autonomous Vehicles. North Dakota State University. ProQuest Dissertations, 2017. (year 2017) 2017.

Vivaldini, Mauro; Pires, Silvio R I; de Souza, Fernando Bernardi. Improving Logistics Services Through the Technology Used in Fleet Management. Journal of Information Systems and Technology Management : JISTEM; Sao Paulo vol. 9, Iss. 3, (2012); 541-562. (Year: 2012) 2012.

* cited by examiner

SYSTEM AND METHOD FOR ADDING ITEMS TO AN ELECTRONIC ORDER

CROSS-REFERENCE TO RELATED APPLICATIONS

This application is a continuation of U.S. patent application Ser. No. 15/444,977, filed Feb. 28, 2017, to be issued as U.S. Pat. No. 10,853,871, which are incorporated herein by reference in their entirety.

FIELD OF THE DISCLOSURE

The present invention relates to the remote ordering of goods or items by a customer that are to be assembled at a store or facility, and more particularly, to systems and methods for use in adding items to an electronic order.

BACKGROUND

Many customers order items or goods remotely, e.g., online, through the Internet, or using a specially designed application or app on a mobile device, such as a tablet or cell phone. The customer may desire that the goods in the order be delivered to their home or that the goods in the order be assembled and ready for the customer to pick up at a specific location, e.g., a particular store, typically at a specific time.

However, once a customer has submitted an online order, the customer may later think of additional items that the customer wants to order. The customer may not want to travel to the same store twice, but may rather want to pick up both the original order and the additional items in the same store visit. Once the order has been submitted, however, and the order has been transmitted to the store for assembly, the customer may be unable to make changes to the order.

The present invention is aimed at one or more of the problems identified above.

SUMMARY OF THE INVENTION

In one embodiment, a system for use in preparing an order for a customer includes a database including a plurality of purchasable items available for purchase by a customer, wherein the purchasable items include at least one of consumer goods and services offered at a store. The system also includes an order assembly server and an order server. The order server includes a processor programmed to display a website including the plurality of purchasable items to the customer via a customer device and allow the customer to select at least one of the purchasable items for purchase. The processor is also programmed to add the selected purchasable items to an online order, receive a request from the customer device to complete the order, receive a selection of a pick-up time for the customer to retrieve the order at a store, and transmit the online order and the selected pick-up time to the order assembly server. The order assembly server is configured to begin assembling the selected purchasable items for pick-up at the store, receive a selection of an additional purchasable item to add to the selected pick-up time, and assemble the order and the additional purchasable item for pick-up at the selected pickup time.

In another embodiment, a method for preparing an order for a customer includes providing a database including a plurality of purchasable items available for purchase by a customer, wherein the purchasable items include at least one of consumer goods and services offered at a store. The method also includes displaying, by an order server, a website including the plurality of purchasable items to the customer via a customer device, and enabling, by the order server, the customer to select at least one of the purchasable items for purchase. The method also includes the order server adding the selected purchasable items to an online order, receiving a request from the customer device to complete the order, receiving a selection of a pick-up time for the customer to retrieve the order at a store, and transmitting the online order and the selected pick-up time to an order assembly server. The order assembly server begins assembling the selected purchasable items for pick-up at the store, receives a selection of an additional purchasable item to add to the selected pick-up time, and assembles the order and the additional purchasable item for pick-up at the selected pickup time.

Various embodiments can include a system. The system comprises one or more processors and one or more non-transitory computer-readable media storing computing instructions configured to run on the one or more processors to perform certain acts. The acts include receiving, from a customer device at a first time, an online order of at least one of a plurality of items for a customer. An online order can include a customer identification for the customer. The acts further can include receiving, from the customer device, a selection of a pick-up time for retrieval of the online order at a store. The acts also can include receiving, at a second time after the first time, an additional order for the customer. The additional order can include one or more additional items from the plurality of items and the customer identification. The acts additionally can include linking the additional order to the online order based on the customer identification. When the additional order is received before a cutoff time for the pick-up time, the acts also can include sending instructions to an assembler. The instructions can include to read identifiers for the at least one of the plurality of items of the online order and for the one or more additional items of the additional order, to retrieve the at least one of the plurality of items and the one or more additional items from a facility, and to place the at least one of the plurality of items and the one or more additional items in a designated location.

Several embodiments can include a method. The method can be implemented via execution of computing instructions configured to run on one or more processors and stored at one or more non-transitory computer-readable media. The method can include receiving, from a customer device at a first time, an online order of at least one of a plurality of items for a customer. The online order can include a customer identification for the customer. The method also can include receiving, from the customer device, a selection of a pick-up time for retrieval of the online order at a store. The method further can include receiving, at a second time after the first time, an additional order for the customer. The additional order for the customer can include one or more additional items from the plurality of items and the customer identification. The method also can include linking the additional order to the online order based on the customer identification. When the additional order is received before a cutoff time for the pick-up time, the method further can include sending instructions to an assembler. The instructions can include to read identifiers for the at least one of the plurality of items of the online order and for the one or more additional items of the additional order, to retrieve the at least one of the plurality of items and the one or more additional items from a facility, and to place the at least one of the plurality of items and the one or more additional items in a designated location.

BRIEF DESCRIPTION OF THE FIGURES

Non-limiting and non-exhaustive embodiments of the present invention are described with reference to the following figures, wherein like reference numerals refer to like parts throughout the various views unless otherwise specified.

DETAILED DESCRIPTION

Figure 1:
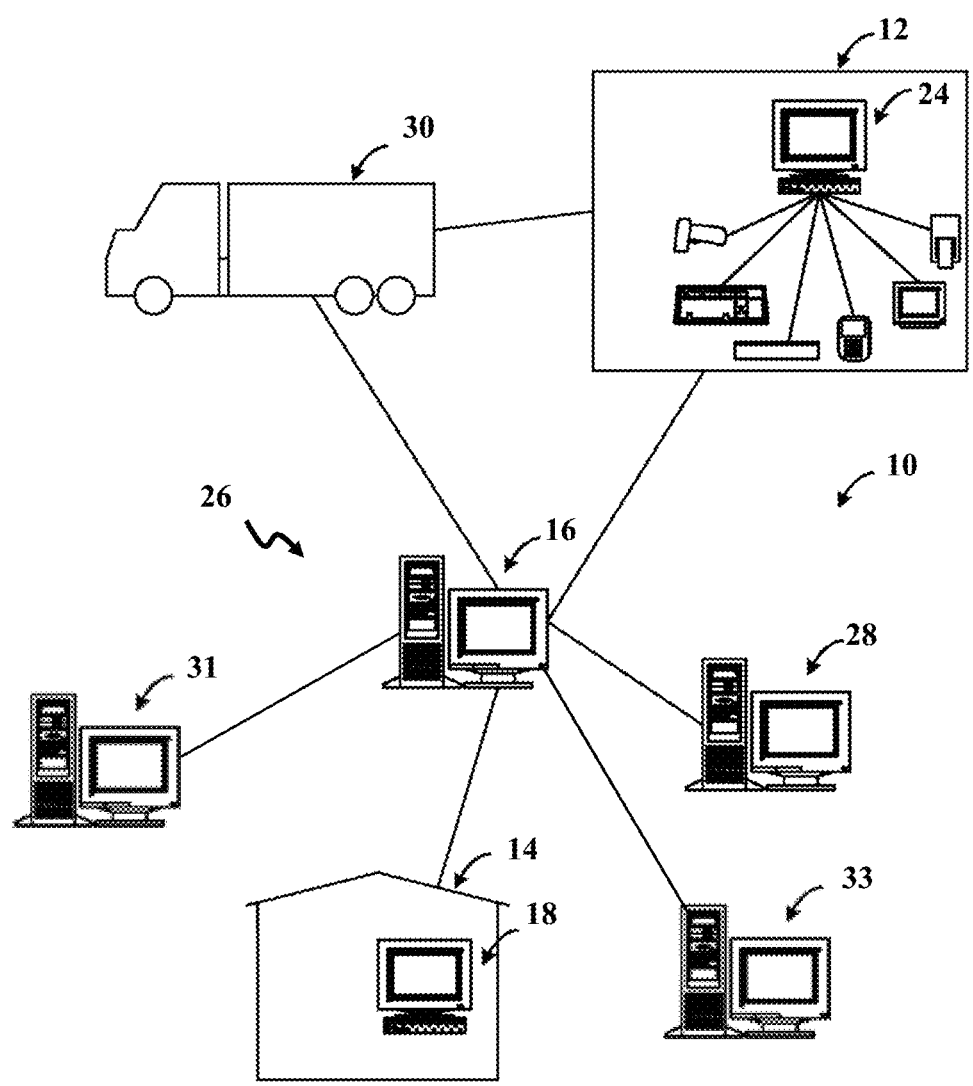
FIG. 1 is a schematic illustrating various aspects of a system according to the present disclosure.

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

Several (or different) elements discussed below, and/or claimed, are described as being "coupled", "in communication with", or "configured to be in communication with". This terminology is intended to be non-limiting, and where appropriate, be interpreted to include without limitation, wired and wireless communication using any one or a plurality of a suitable protocols, as well as communication methods that are constantly maintained, are made on a periodic basis, and/or made or initiated on an as needed basis.

With reference to the FIGS. and in operation, the present invention provides a system and method that facilitates adding items to online orders that have already been finalized and transmitted to a store for fulfillment.

In one embodiment, an order server presents a web page displaying a plurality of purchasable items to a customer, such as consumer goods or services offered by the store. The customer may select one or more purchasable items to add to an online order (sometimes referred to as a "basket"). The customer may also select whether to have the items delivered to a customer-selected address or to have the items assembled at a store for pick-up by the customer. The customer also selects a delivery window (if the customer selected the delivery option) or a pick-up window (if the customer selected the in-store pick-up option). When the customer is finished shopping, the customer may finalize the order by selecting a "check out" button or the like on the web page. The order server receives the finalized order and transmits the order to an order assembly server for fulfillment of the order.

The order assembly server may transmit the order to an appointment server which manages the workflows of store employees who assemble orders. The appointment server may assign the order to a store employee that has capacity to assemble the order by the fulfillment window.

In some embodiments, while the customer's order is pending (i.e., being fulfilled at the store), the customer may later decide to add one or more purchasable items to the order so that the additional items are available for pick-up during the same fulfillment or pick-up window as the customer's pending order. The order server may receive a selection of the additional item or items and may treat the additional item or items as a separate order that is linked to the pending order. The order server may transmit the additional order to an order forecasting server to estimate an amount of time needed to fulfill or assemble the order. The order forecasting server may transmit the estimated time to the appointment server to determine whether the store employee who is assigned to the pending order has sufficient time to assemble the additional order by the time the pick-up window arrives. If the appointment server determines that the employee has sufficient time to assemble the additional order, the appointment server may transmit a message or notification to order forecasting server which in turn may transmit a message or notification to the order server. The order server may then enable the customer to finalize the order for the additional items with the prior-selected pick-up window.

The order server may then transmit the additional order details to the order assembly server, which in turn transmits the order details to a handheld unit operated by the store employee assigned to the pending order and the additional order. The store employee may then assemble both orders together to ensure that both orders are ready for pick-up during the pick-up window.

Referring to FIG. 1, an exemplary environment in which the system 10 operates is illustrated. A customer may desire to purchase items from a facility at a specified location, such as a store 12. The store 12 may be representative of a larger corporate environment which may provide many avenues of interface with a customer. In a modern shopping environment, a store 12 may include both one or more brick and mortar retail locations and an on line retail location.

It should be noted that the store 12 may include, or be part of, a plurality of stores 12. The customer, as explained below, may be allowed to choose the store from the plurality of stores 12.

Generally, the customer may desire to order items from the store 12 and have the items (or goods) delivered to a customer-specified location 14 such as the customer's residence, business, other residence, storage lockers, etc. Alternatively, the customer may desire to pick up the order from the store 12.

The system 10, in addition to facilitating the assembly of the order at the store, may be configured to allow or facilitate orders to be efficiently delivered to the customer location 14 or to be picked up at a selected store 12. The customer may desire and request that the order be delivered or picked up the same day that the order is placed or a future day. Furthermore, the customer may request a delivery or pick-up time or window.

For clarity in discussing the various function of the system 10, multiple computers and/or servers are discussed as performing different functions in delivering goods to a customer and receiving customer-owned items from the customer. These different computers (or servers) may, however, be implemented in multiple different ways such as modules within a single computer, as nodes of a computer system, etc. The functions performed by the system 10 (or nodes or modules) may be centralized or distributed in any suitable manner across the system 10 and its components, regardless of the location of specific hardware. Furthermore, specific components of the system 10 may be referenced using functional terminology in their names. The function terminology is used solely for purposes of naming convention and to distinguish one element from another in the following discussion. Unless otherwise specified, the name of an element conveys no specific functionality to the element or component.

The system 10 may include or have an associated first server such as, for example, an order server 16. The order server 16 may host a store website including one or more web pages which allow a customer to, via a customer device 18, interact with the store 12 and order server 16 to place an order for one or more items or goods from the store 12. Alternatively, the order server 16 may communicate and interact directly with the customer device 18 via appropriate software applications or apps running on the order server 16 and the customer device 18.

The order server 16 may include a database (shown in FIG. 5) that includes a product list including products, goods, and/or services which are for sale within the store 12 with information relevant to these items. The order server 16 may include software to allow delivery of items to a customer or to facilitate pick-up of the items from the store 12 by the customer. Particularly, the order server 16 may provide an internet webpage to allow a customer to select consumer goods, services offered by the store, select or enter delivery or pick-up information, and purchase the items in a virtual shopping environment. The order server 16 may communicate with other computers, servers, or components of the system 10 to deliver the items to the customer or to arrange for pick-up of the items.

The system 10 may also include a second server such as, for example an order assembly server 24. The order assembly server 24 may interact with the store 12 and assist the store employees in picking items for orders and assembling the order. The order assembly server 24 and other hardware components that may be located at the store or facility may be referred to as an order fulfillment system 26.

The system 10 may also include a third server such as, for example, a delivery server 28. The delivery server 28 may manage delivery routes for a delivery service 30 which delivers goods to and from a customer. The delivery server 28 may determine when, during a day, there is sufficient time to deliver an order to the customer and may provide information to the order server 16 to allow the order server 16 to provide customized information to the customer during the ordering process to allow the customer to select a desired delivery window or pick-up time (sometimes referred to as a pick-up appointment or window) which may be fulfilled by the store 12 and delivery service 30.

A fulfillment window is then selected based on the selected delivery window or pick-up window. The fulfillment window represents a time by which a store employee assigned to the order must gather or otherwise assemble the order to ensure that the order is ready to be picked up by the customer during the pick-up window or to ensure that the order is ready to be delivered in time for the delivery window. Accordingly, in embodiments in which the customer has selected in-store pick-up, the fulfillment window may be synonymous with the pick-up window.

The system may also include an appointment server 31 and an order forecasting server 33. Appointment server 31 receives a notification that the order has been finalized (i.e., that the customer has completed a check out process for the order) and assigns the order to a store employee to fulfill the order. In one embodiment, appointment server 31 manages a workflow or task list of each store employee and also estimates a time period needed to fulfill each order. Alternatively, order forecasting server 33 estimates a time period to fulfill each order.

When appointment server 31 receives a notification of a finalized order, appointment server 31 estimates the time needed to fulfill the order (or receives the estimate from order forecasting server 33) and compares the time to the workflow of each employee. Appointment server 31 assigns the order to an employee that is determined to have sufficient time available to fulfill the order by the selected fulfillment window. For example, appointment server 31 or order assembly server 24 may transmit a notification or message to a handheld device operated by the assigned employee with the order details (e.g., the consumer goods or services ordered, the order ID, the customer name and/or ID, the pick-up or fulfillment window, etc.). The message or notification may be displayed on a dashboard or other display of the employee's handheld unit as a pop-up window or similar notification. Appointment server 31 then updates the selected employee's workflow to reflect the assignment of the order and the selected fulfillment window for the order.

In one embodiment, order forecasting server 33 may select the fulfillment window based on the estimation of how long it should take for an employee to assemble the order and based on the customer-selected pick-up or delivery window. Alternatively, order assembly server 24 or another suitable server of system 10 may select the fulfillment window based on the same.

In some embodiments, appointment server 31 enables a new or additional order to be added to a pending order (i.e., an order that has not yet been delivered or picked up by the customer) or to the delivery window or pick-up window of the pending order. In such an embodiment, the new or additional order may be flagged or otherwise identified as an express order such that the order is treated in an expedited manner as compared to other orders. The original or pending order and the additional order may be assigned separate order IDs, for example, and appointment server 31 and/or order assembly server 24 may associate or link the original order ID with the additional order ID to ensure that both orders are fulfilled by the same store employee for the same fulfillment window.

Order forecasting server 33 may be used to determine whether one or more additional items selected by the customer may be added to the order after the order has been finalized and transmitted to the store (e.g., after the order has been transmitted to order assembly server 24 and/or to appointment server 31). For example, order forecasting server 33 may estimate an amount of time needed to fulfill the additional items (i.e., gather the additional items together for pickup or delivery to the customer) and may determine whether sufficient time exists to add the items to the existing fulfillment window. To estimate the amount of time needed to fulfill the additional items and to include the items in the originally selected fulfillment window, order forecasting server 33 may consider the number of items added, the workflow of the store employee assigned to the original order (i.e., how busy the employee is and how much time is available on the employee's workflow to handle the additional items), and how close in time the order for the additional items is to the originally selected fulfillment window, for example.

In some embodiments, order forecasting server 33 may also suggest or offer additional purchasable items, such as consumer goods or services, to the customer that order forecasting server 33 determines can be added to the original order while maintaining the originally selected fulfillment window. The additional services that may be added to an original order may include, for example, a photo service for picking up photos, pharmacy services for picking up prescriptions, tire & lube services for obtaining an oil change or other maintenance service on a vehicle, clinic services for obtaining healthcare services, and/or any other suitable services offered by the store. The services can include an appointment or reservation scheduled for the service at a selected order pick-up or fulfillment window. The additional consumer goods may be any of the goods listed in the product database, or may be a subset of the products that are categorized as being available for express pick-up, for example.

Order forecasting server 33 may receive notification of a pending order and may determine whether any additional goods or services can be added to the pick-up window. For example, order forecasting server 33 may determine that current wait times for a car oil change are approximately 30 minutes, the oil change itself will take approximately 30 minutes, and a customer's selected fulfillment window is 2 hours away. In such an example, order forecasting server 33 may determine that sufficient time exists to add an oil change service to the customer's fulfillment window. Accordingly, order forecasting server 33 may transmit a notification or offer to the customer to offer or suggest adding the oil change as an add-on to the original order to enable the customer to obtain both the originally purchased items and the oil change in the same visit to the store during the same fulfillment window. If the customer accepts the offer, order forecasting server 33 or order assembly server 24 may automatically place a reservation or appointment for the service to be performed at the scheduled time (e.g., at the time of the originally scheduled fulfillment window). In such an embodiment, the customer may shop in a more efficient manner and customer satisfaction may be increased.

Returning to the order process, a customer purchasing items from the store 12 for delivery to a customer location 14 or pick-up at a store 12 will typically view an internet webpage or access an application or app corresponding to the store. The customer may have an account with the store and may sign into the system 10. A customer account may include information about the customer such as a unique customer ID, name, address, past purchase history, etc. The webpage or app may display, to the customer, consumer goods at the store 12 which are available for pick-up or delivery. Not all items may be available for pick-up (at a specific or selected store) or for delivery. The customer may select items or goods for purchase. In signing into an account or entering information for a purchase, the order server 16 may receive (from the customer) customer information which facilitates delivery of goods to the customer. Particularly, the order server 16 may receive the address of the customer-specified location 14 where purchased items are to be delivered. Alternatively, the order server 16 may receive a customer selection of a store 12 at which the customer desires to pick-up the order.

Figure 11:
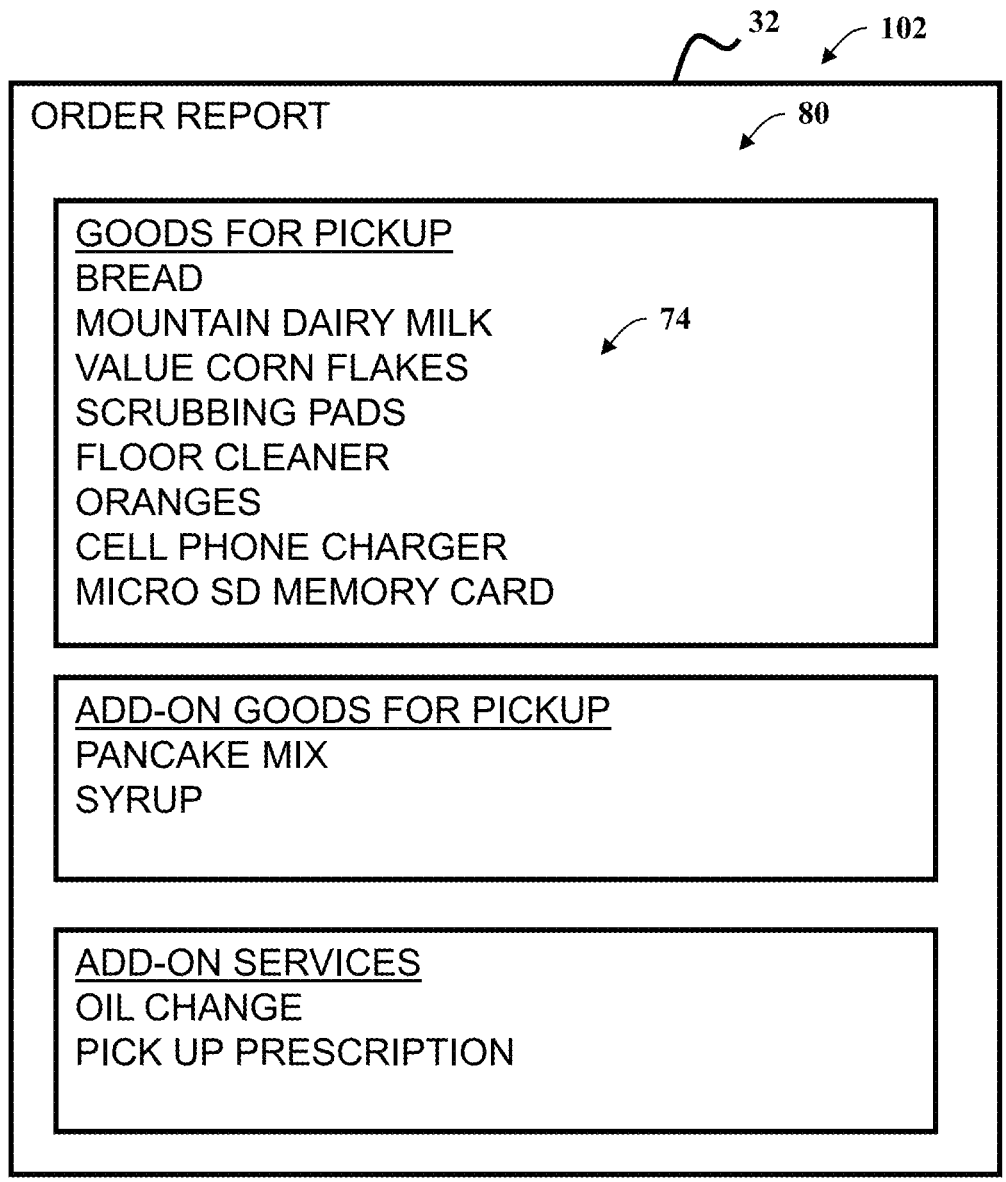
FIG. 11 is an illustration of an exemplary screenshot from the system of FIG. 1, according to an embodiment of the present invention.

The order server 16 may provide customer information, such as the address of the customer-specified location 14, to the delivery server 28. The delivery server 28 may use the customer information to determine time periods during the day when a delivery service 30 may deliver the items to the customer. The delivery server 28 may manage multiple delivery vehicles/routes throughout the day for the delivery service 30 and may determine how much time a delivery vehicle has available and how much time is required to deliver the items to the customer location 14. The delivery server 28 may determine when during the day a delivery vehicle (or other delivery service) may deliver the items to the customer. The delivery server 28 may provide information regarding when the delivery service 30 is able to deliver items to the customer location 14 to the order server 16. In one embodiment, the order server 16 may generate an order report 32 (shown in FIG. 11) including a list of purchased goods to be delivered to the customer, and transmit the order report 32 to the delivery server 28 for use in delivering the purchased goods to the customer. In one embodiment, the delivery server 28 may display the delivery report to a delivery operator such as, for example, a delivery vehicle operator or delivery driver, via an operator device such as, for example a delivery device 34 to enable the delivery operator to view and/or modify the order report 32.

The order server 16 may then transmit information regarding the order to the store 12, and in particular to the order assembly server 24. The order assembly server 24 may be coupled to, or in communication with, a computer system as well as one or more operator devices or handheld devices 36 such as, for example, assembler devices 38 to assist store employees in preparing customer orders for delivery. The assembler devices, which may be handheld devices (see below), may provide information to a store employee or assembler, may allow a store employee to scan items, and may allow the assembler(s) to print stickers and/or labels, notices, notes, reports, and/or any suitable tangible medium for those items. The store employee may collect items throughout the store 12 and arrange for those items to be assembled and ready for delivery to one or more customer locations 14 or for pick-up at the store 12.

In one aspect of the invention, the assembler is an employee, i.e., a person, or employees, who utilize the handheld device(s) 36 to assemble the customer order. In another aspect of the present invention, the assembler may be, at least in part, an automatic inventory retrieval system, or AIRS, that automatically retrieves the items from the facility. The AIRS may include one or more robots under control of a suitable controller that is able to read the items in the customer order, retrieve the items from the facility, and place the items in a designated location, such as in a designated bin, in order to facilitate assembly of the customer order. The specific nature, including number and type, of robots required will be dependent upon the layout of the facility, the manner in which the items or goods are stored, and the nature of the items or goods. In some embodiments, of the present invention the assembler devices may be integrated with the AIRS. For purposes of the discussion below, the terms "assembler", "assembler device" or "handheld device" include (1) an employee/person who utilizes an assembler or handheld device and/or (2) an automated inventory retrieval system (AIRS) with an integrated assembler device.

Figure 2:
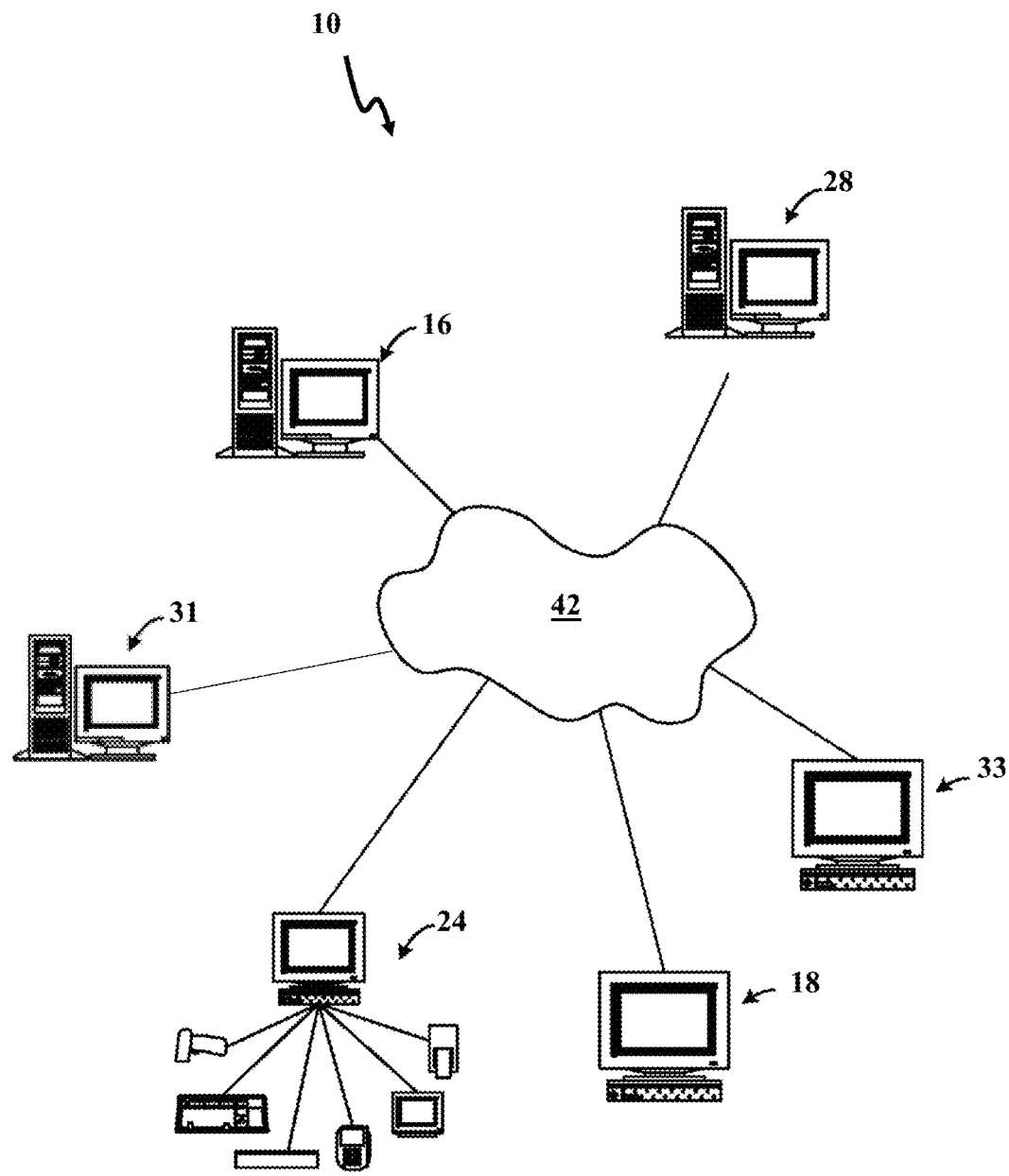
FIG. 2 is a schematic illustrating a portion of the system of FIG. 1 in context of order fulfillment and delivery, according to an embodiment of the present invention.

Referring to FIG. 2, in selected embodiments, the software, hardware, and associated components of the system 10 may be programmed and configured to implement one or more embodiments described herein. A customer may communicate with the order server 16 via the customer device 18 and a communications connection or network 42 to select items for purchase. The order server 16 may also communicate with the order assembly server 24, the delivery server 28, the appointment server 31, and the order forecasting server 33 via a communications connection 42. The communications connection 42 may be any suitable connection, including the Internet, file transfer protocol (FTP), an Intranet, LAN, a virtual private network (VPN), cellular networks, etc., and may utilize any suitable or combination of technologies including, but not limited to, wired and wireless connections, always on connections, connections made periodically, and connections made as needed.

The customer device 18, delivery device 34, and/or assembler device 38 may include any suitable device, including, but not limited to, a desktop computer, a laptop or notebook computer, a tablet, a handheld mobile device including a cellular telephone, and the like.

Figure 3:
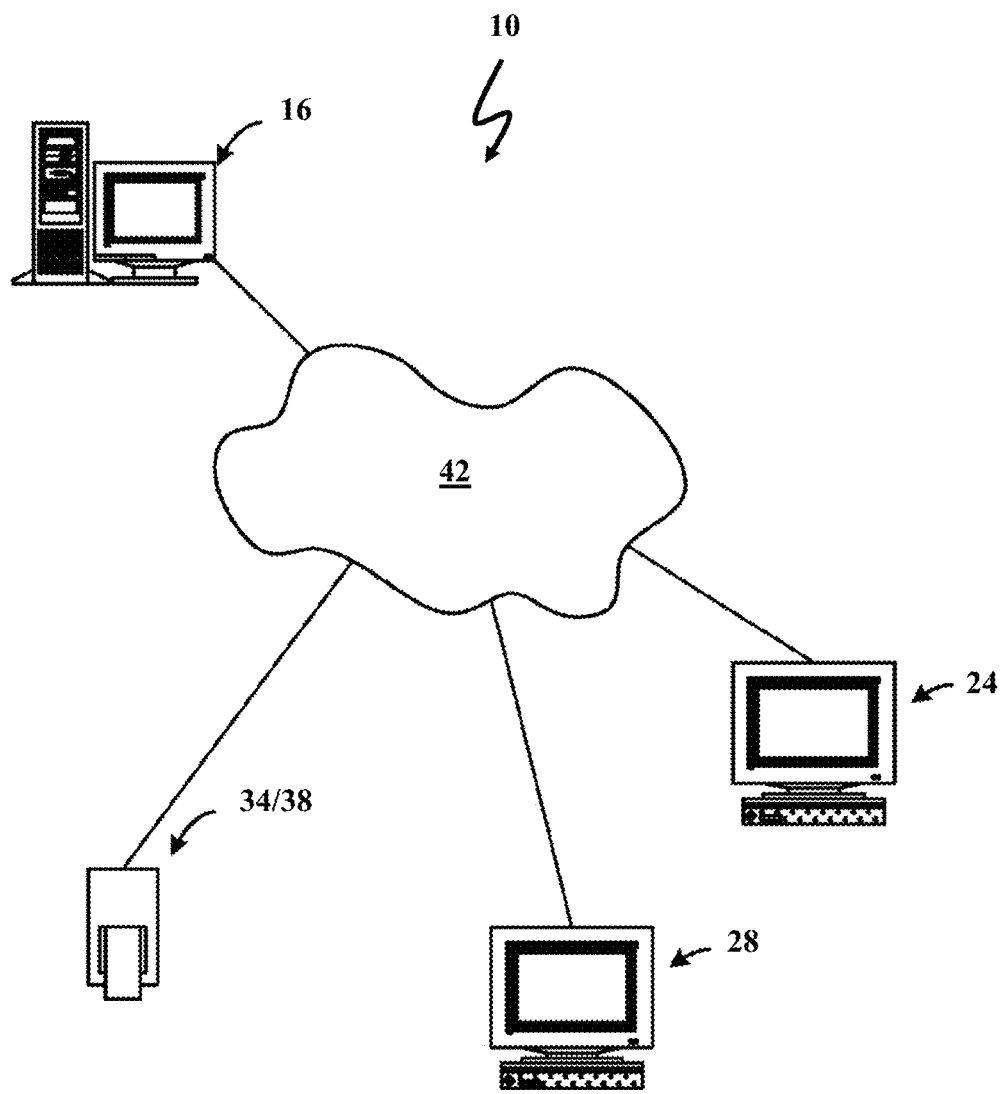
FIG. 3 is a second schematic illustrating a portion of the system of FIG. 1 in context of order fulfillment and delivery, according to an embodiment of the present invention.

Referring to FIG. 3, in selected embodiments, the hardware, software, or hardware and software of the order server 16, the order assembly server 24, and the delivery server 28 may be configured to receive and utilize item information as described herein, performing functions associated with the order server 16 and order assembly server 24. The order assembly server 24 may communicate with the customer device 18, the delivery device 34, and an assembler device 38 via a communications connection or network 42. In this manner, the various aspects of the system may be exemplified as software, modules, nodes, etc. of a store computer or order assembly server 24.

Figure 4:
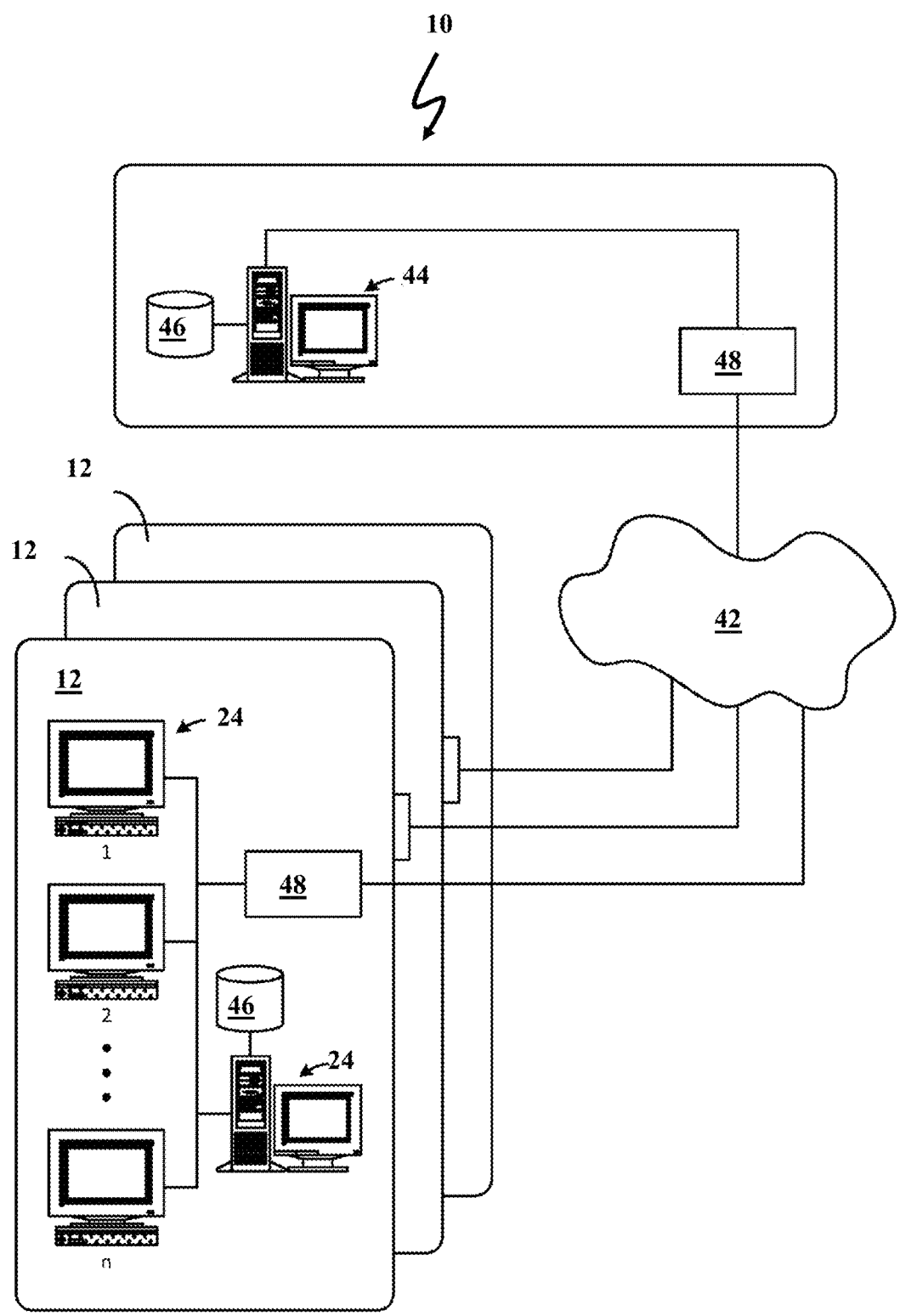
FIG. 4 is a schematic illustrating the system of FIG. 1 in a multiple store environment, according to an embodiment of the present invention.

Referring to FIG. 4, in selected embodiments, the system 10 may operate substantially independently, as a stand-alone unit. Alternately, a store system 44 may operate as a larger system. For example, multiple stores 12 may operate at different locations (e.g., different brick-and-mortar stores, facilities, and/or warehouses). In such embodiments, each local system may have an order assembly server 24 as well as other computers or handheld devices 36, database and data storage devices 46, and networking devices 48 as necessary. Each local system may be connected to the order server 16 via a network or internet connection 42. The order server 16 may be associated with database and data storage device 46 and a network device 48 as necessary.

As referenced above, the order server 16 may be configured to perform one or more functions associated with receiving an order from a customer, managing the delivery or pick-up of the customer orders, and streamlining the collection of items for customer orders.

Figure 5:
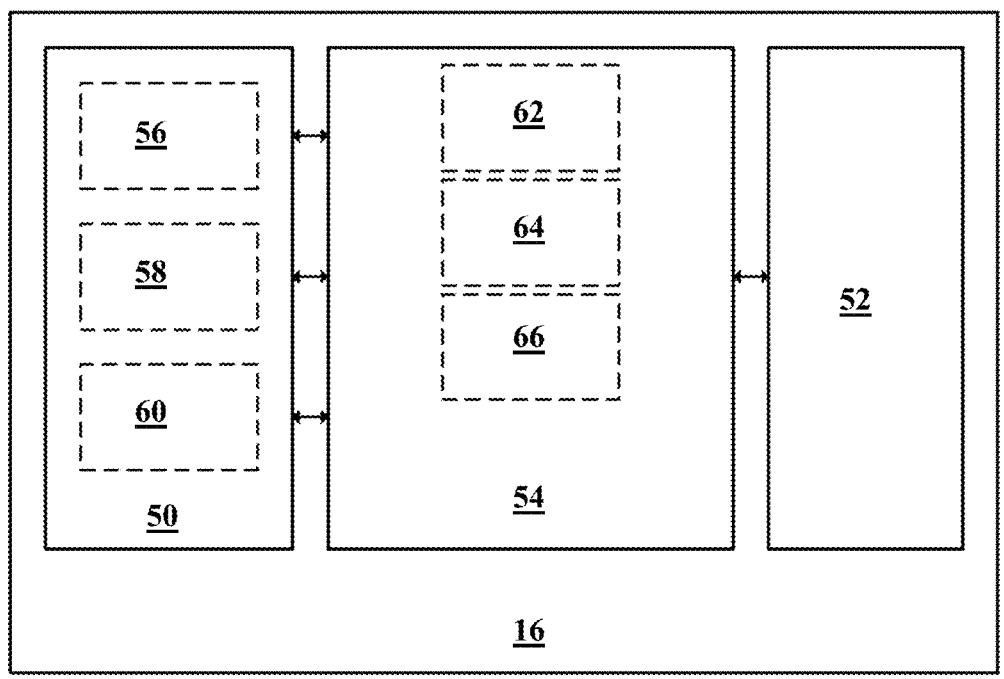
FIG. 5 is a schematic illustrating example components of a server, according to an embodiment of the present invention.

FIG. 5 illustrates an example of the order server 16 configured to perform one or more of the requested functions. In the illustrated embodiment, the order server 16 may include a processing device 50, a communication device 52, and a memory device 54.

The processing device 50 can include memory, e.g., read only memory (ROM) and random access memory (RAM), storing processor-executable instructions and one or more processors that execute the processor-executable instructions. In embodiments where the processing device 50 includes two or more processors, the processors can operate in a parallel or distributed manner. In an example, the processing device 50 may execute a web or application module 56, a delivery module 58, and an order fulfillment module 60.

The communication device 52 is a device that allows the order server 16 to communicate with another device, e.g., the customer device 18, delivery device 34, assembler device 38, etc. The communication device 52 can include one or more wireless transceivers for performing wireless communication and/or one or more communication ports for performing wired communication.

The memory device 54 is a device that stores data generated or received by the order server 16. The memory device 54 can include, but is not limited to, a hard disc drive, an optical disc drive, and/or a flash memory drive. Further, the memory device 54 may be distributed and located at multiple locations. The memory device 54 is accessible to the processing device 50. In some embodiments, the memory device 54 stores a customer database 62, a consumer product database 64, and a delivery database 66.

In some examples, the customer database 62 can store information associated with a customer. The customer database 62 may, for example, store information associated with a customer account and may include account preferences and customer contact information. The customer database 62 may also store information regarding a customer delivery address as well as specific details regarding delivery of items to the delivery address. The customer database 62 may be queried by the processing device 50 and may provide information to the processing device to facilitate receiving an order from a customer and delivering an order to the customer.

Figure 8:
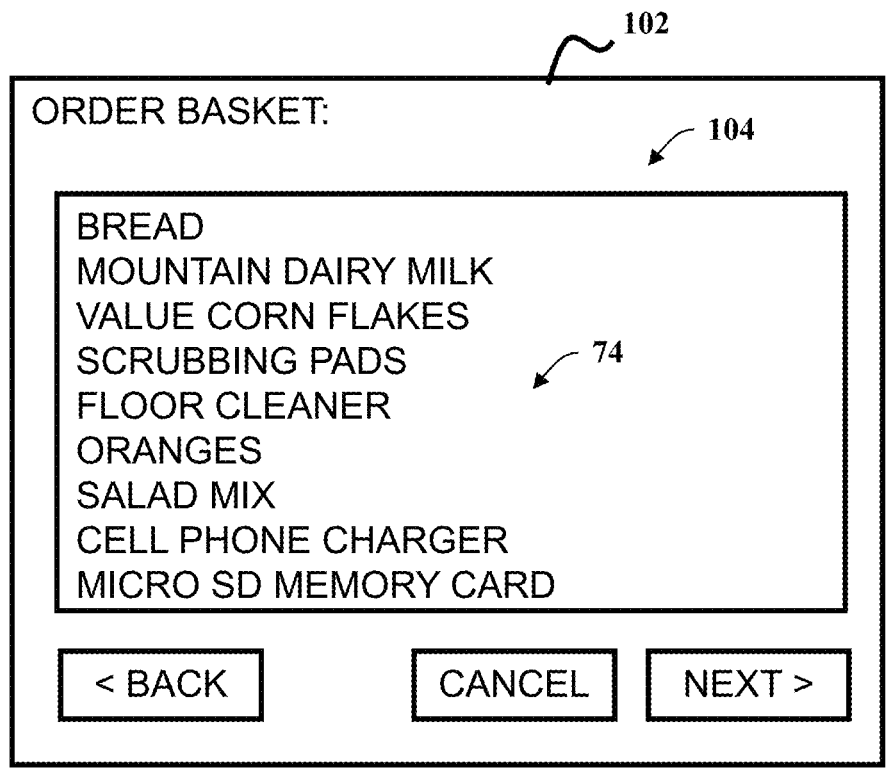
FIG. 8 is an illustration of an exemplary screenshot from the system of FIG. 1, according to an embodiment of the present invention.
Figure 9:
FIG. 9 is an illustration of an exemplary screenshot from the system of FIG. 1, according to an embodiment of the present invention.
Figure 10:
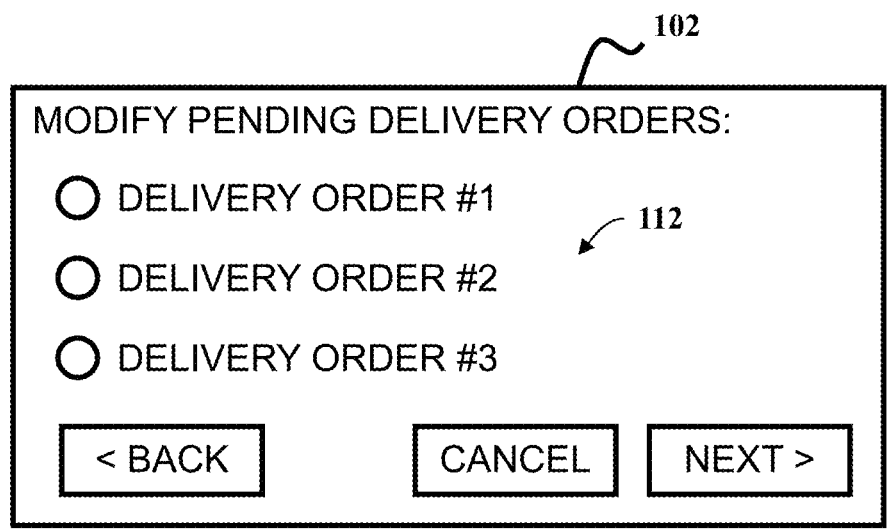
FIG. 10 is an illustration of an exemplary screenshot from the system of FIG. 1, according to an embodiment of the present invention.

In some examples, the consumer product database 64 stores item information associated with goods and/or products, or types of items in the store 12. For example, the product database 64 may store product lists 74 (shown in FIG. 8) including product identification codes, UPC codes, item location in the store 12, as well as other information associated with the goods and/or products. By way of example, the product database 64 may be queried by the processing device 50 and may transmit information to the processing device to facilitate the use of item data.

In some examples, the delivery database 66 stores information to facilitate delivery of customer orders to a customer location 14. The delivery database 66 may store information regarding a map of a delivery area or an area around a store 12, street and traffic information for a delivery area, delivery routes, transit times associated with a delivery area, etc.

The processing device 50 may execute the web or application module 56. The web or application module 56 may present a store interface and item information to a customer, receive customer information and order information, and otherwise handle the purchase transaction with a customer as described herein. The processing device 50 may also execute a delivery module 58. The delivery module 58 may receive customer delivery address information from the web or application module 56 and may determine the customer location, compare the location with existing delivery routes, determine available delivery times, schedule deliveries, create delivery routes, and otherwise manage delivery of customer orders. The web or application module 56 may receive potential delivery times from the delivery module 58 and present these potential delivery times to a customer to allow the customer to select a delivery window for their order. The processing device 50 may further close orders for a delivery route, finalize the delivery route, and interface with a delivery service 30 to deliver orders to customers.

The processing device 50 may execute an order fulfillment module 60. The order fulfillment module 60 may receive customer order information for a delivery route and may facilitate the collection of items from a store to fulfill the customer orders. The order fulfillment module 60 may combine orders together, arrange items according to a predetermined picking order through a store 12, and direct a store employee through the store 12 to collect items for the customer orders.

Figure 7:
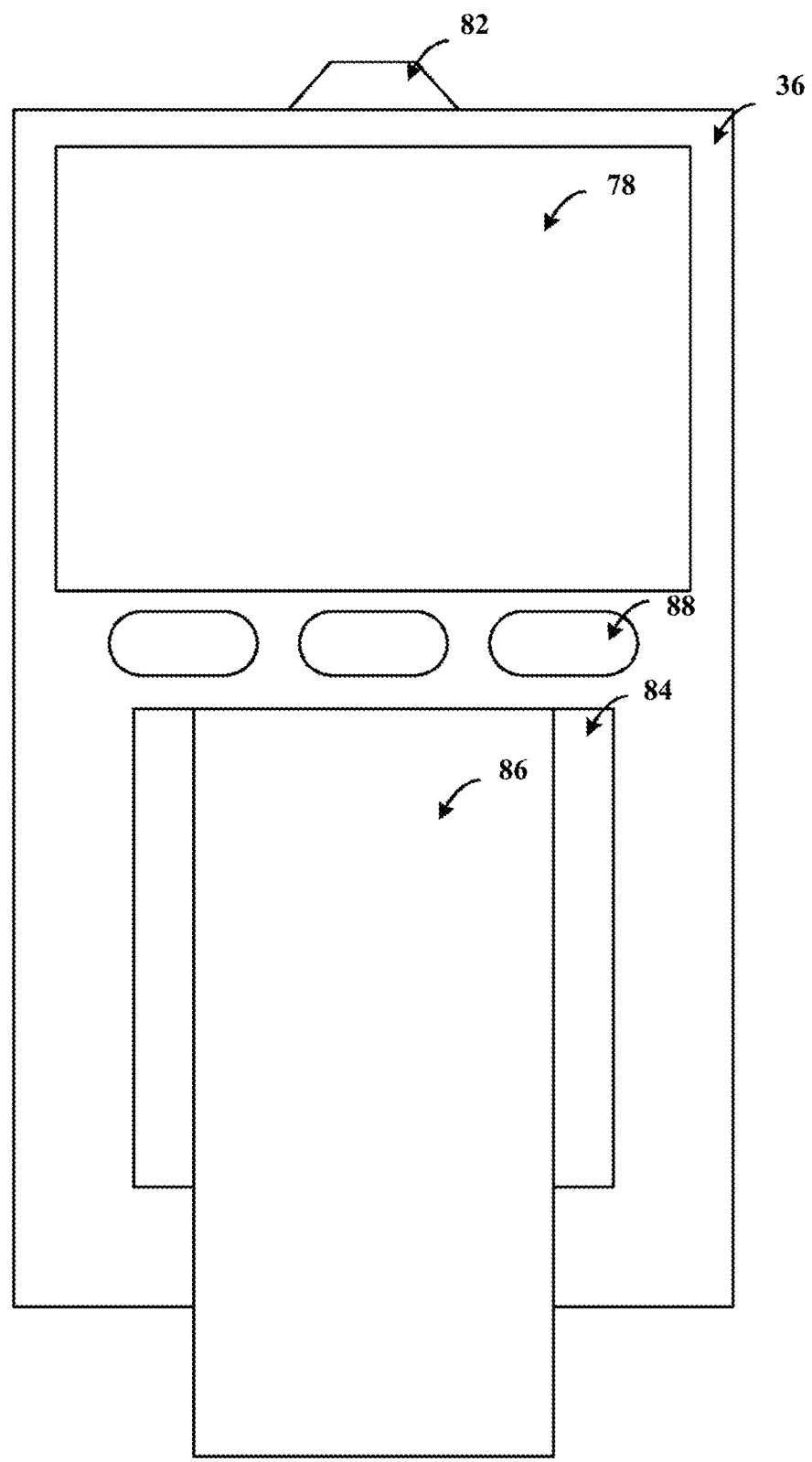
FIG. 7 is a schematic of a handheld device, according to an embodiment of the present invention.

Referring to FIG. 7, a store employee, assembler, and/or delivery personnel may use a handheld computer device 36 while collecting items and/or delivering items for the customer orders. For example, assembler device 38 and/or delivery device 34 may be handheld devices 36 in some embodiments. The handheld device 36 may perform several functions. The handheld device 36 may communicate with the order server 16 and/or the order assembly server 24 to receive a list of items which need to be collected from the store 12 to fulfill the orders. The handheld device 36 may include a display 76 that may present a list of items to the store employee in the order that the employee will encounter the items while following a picking route through the store 12. The display 76 may also present the picking route to the employee, indicating how the employee should progress through the store 12 while collecting items for the customer order(s).

The order server 16 and/or the order assembly server 24 may store item information for all store items which are available for purchase. For example, the order assembly server 24 may store a product identification code for each available store item, the UPC code for each item, item location on the store shelves, and other information as necessary. When a store employee collects an item for the customer orders, the employee may use a scanner 82 on the handheld device 36 to scan the item UPC code. The handheld device 36 may determine if the item is necessary for the customer orders and may indicate whether or not the item is correct to the employee. If correct, the employee may be directed to place the item in a particular collection receptacle or bin for the respective customer order. The handheld device 36 may use a printer 84 to print a sticker label 86 for the item. The sticker label 86 may include a code, barcode, or other machine readable code to identify a particular customer order to which the item pertains. The label 86 may be affixed to the item as the employee collects the item. If desired, the employee may carry multiple boxes, containers, or bins corresponding to the various customer orders and may sort items into the appropriate order receptacle as the items are collected throughout the store 12. It is, however, appreciated that there may often be a sufficient number of customer orders to make it impractical to carry sufficient order receptacles through the store 12. The employee may place items into a single receptacle and bring items to a back area of the store 12 for sorting into different customer orders.

The handheld device 36 may include buttons 88 and other input/output or customer interface devices to permit the store employee and/or delivery personnel to perform the designated functions. The handheld device 36 may also include a communications device to permit the handheld device 36 to communicate with the order server 16 and/or the order assembly server 24, such as by communicating over a store wireless network.

Typically, customer orders are finalized and presented via order assembly server 24 after being finalized. The order assembly server 24 may allow store employees to see customer orders which have not been verified. This may allow store employees to monitor large orders or orders in a period of high demand and, if desired, start to collect items for these orders before the desired pick-up time or scheduled delivery time is finalized to be able to meet the demand.

Figure 6:
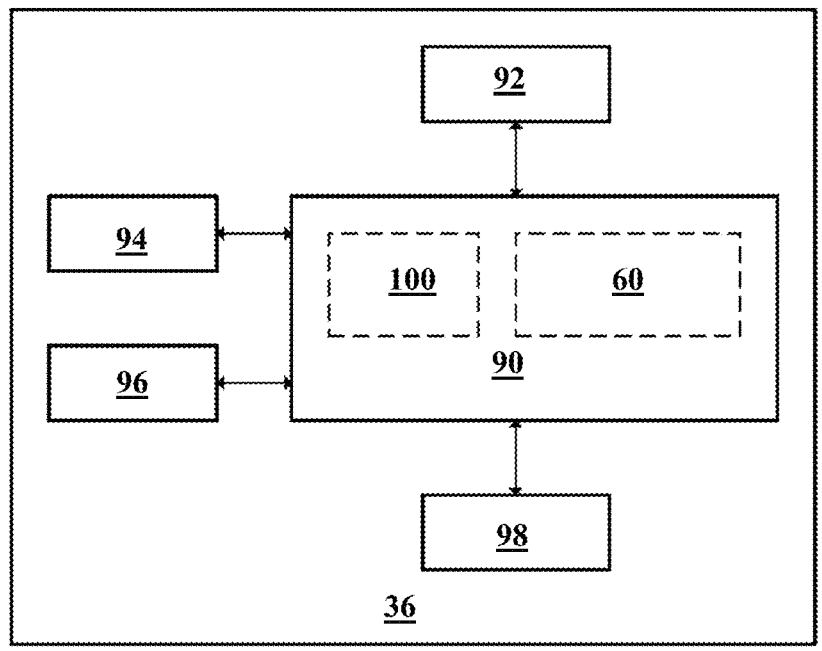
FIG. 6 is a schematic illustrating example components of a handheld device, according to an embodiment of the present invention.

Referring now to FIG. 6, a schematic showing example components of the handheld device 36 is illustrated. The handheld device 36 may include a processing device 90, a user interface 92, an output device 94, a communication device 96, and a memory device 98. It is noted that the handheld device 36 can include other components and some of the components may not be required in every example.

The processing device 90 can include memory, e.g., read only memory (ROM) and random access memory (RAM), storing processor-executable instructions and one or more processors that execute the processor-executable instructions. In embodiments where the processing device 90 includes two or more processors, the processors can operate in a parallel or distributed manner. The processing device 90 can execute an operating system of the handheld device 36. In the illustrative example, the processing device 90 also executes a software module 100 such as scanning and printing software and an order fulfillment module 60.

The user interface 92 is a device that allows a user, a store employee in particular, to interact with the handheld device 36. While one user interface 92 is shown, the term "user interface" can include, but is not limited to, a touch screen, a physical keyboard, a mouse, a microphone, and/or a speaker. The output device 94 is a device which allows a store employee and/or delivery personnel to output information from the handheld device 36. In particular, the output device 94 may allow a store employee and/or delivery personnel to print delivery order reports and/or labels for store items and associate collected store items with a particular customer order. The communication device 96 is a device that allows the handheld device 36 to communicate with another device, e.g., the order server 16, the order assembly server 24 or the delivery server 28. The communication device 96 can include one or more wireless transceivers for performing wireless communication and/or one or more communication ports for performing wired communication. The memory device 98 is a device that stores data generated or received by the handheld device 36. The memory device 98 can include, but is not limited to, a hard disc drive, an optical disc drive, and/or a flash memory drive. The software module 100 may be stored on the memory device 98 and the order fulfillment module 60 may be created from the software module 100.

The order fulfillment module 60 allows a user, a store employee in particular, to efficiently collect items from a store 12 to fulfill customer orders. The order fulfillment module 60 may execute some or all of the functions described herein to receive one or more customer orders, combine those customer orders, order items in the customer orders sequentially according to a predetermined picking route through the store 12, and guide an employee through the store 12 to collect the items necessary to fulfill the customer orders.

Figure 12:
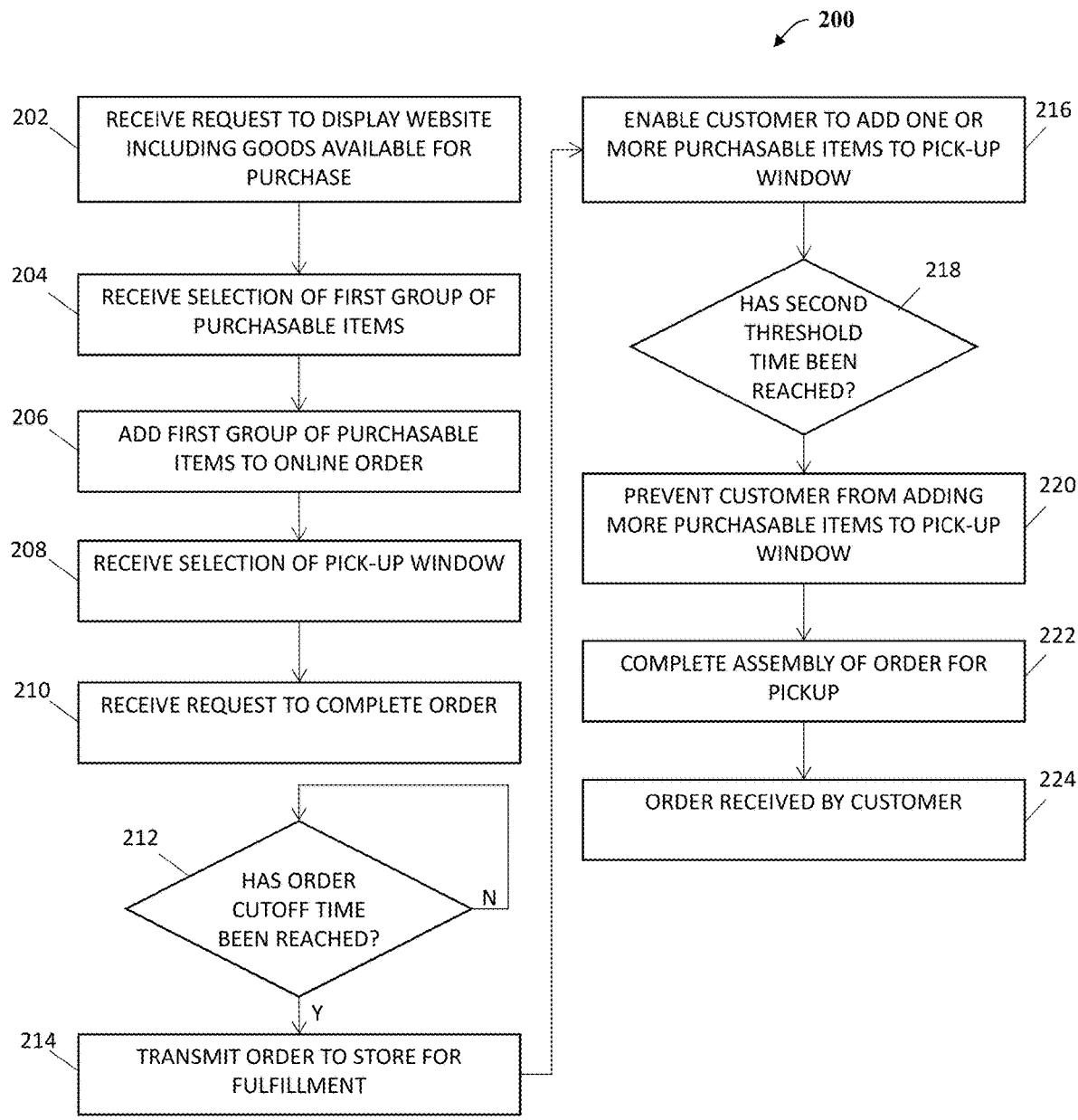
FIG. 12 is a flowchart of a method that may be used with the system shown in FIG. 1, according to an embodiment of the present invention.

FIG. 12 is a flowchart of a method 200 that may be used with system 10 to enable a customer to order and pick up consumer goods from a store. Each step of method 200 may be performed independently of, or in combination with, other method steps. Portions of the method may be performed by any one of, or any combination of, the components of the system 10. While the following description applies to goods ordered by a customer for pick-up at a store, it should be recognized that the steps of method 200 may also be applied to an order of goods for delivery to a customer-selected location 14.

In one embodiment, method 200 includes receiving 202, by the order server 16, a request from one or more customer devices 18 to display one or more web pages 102 associated with a website hosted by the system 10. Order server 16 retrieves and causes the requested web pages 102 to be displayed on a corresponding customer device 18. In one embodiment, the website may include an e-commerce website that enables a consumer to view and purchase and/or order various goods and services from one or more merchants via the website. The order server 16 may retrieve a product list 74 from the product database 64 and display a product webpage 104 including a plurality of consumer goods from the product list 74 that are available for purchase by the customer. In one embodiment, the customer may use a store website or specially designed application or app to order various items for pick-up at a specified store 12. A customer may create an account or logon to an existing account with the order server 16 including a unique customer ID, or may enter this information while making a purchase. The order server 16 transmits customer information and the customer order to the order assembly server 24.

The order server 16 may receive 204 a selection of a first group of purchasable items to be purchased by the customer via the customer device 18. For example, the order server 16 allows the customer to select one or more of the consumer products being displayed on the product webpage 104, and allows the customer to select a customer-specified store for pickup of the selected consumer goods.

The order server 16 adds 206 the first group of consumer goods or services to an online order (sometimes referred to as a "basket"). The order server 16 also receives 208 a selection from the customer of a pick-up window that indicates a desired time or window of time at which the customer would like the order to be fulfilled and ready for pickup by the customer. In addition, the order server 16 responsively generates a customer order report 32 including the selected consumer goods, the selected pick-up window, and the customer ID associated with the customer. In one embodiment, the order server 16 displays a customer location selection page 106 that allows the customer to select a customer-specified pick-up location for the purchased consumer goods.

The order server then receives 210 a request to complete the order, or check out, by the customer. In response, order server 16 may identify the order as being complete or finalized. Order server 16 determines 212 whether an order cutoff time has been reached before transmitting the order to a store for fulfillment. For example, in some embodiments, all orders received by 3:00 am (or another suitable time) may be transmitted to a respective store (i.e., order assembly server 24) for assembly or fulfillment of the order. In such an embodiment, order assembly server 24 may transmit 214 the order to the store (e.g., to order assembly server 24) for fulfillment upon a determination 212 that the order cutoff time has been reached.

When order assembly server 24 receives the order (or a notification that the order is complete and ready for fulfillment), order assembly server 24 may begin the order fulfillment process. For example, order assembly server 24 or appointment server 31 may assign the order to a store employee that is determined to have sufficient time in his or her workflow to assemble the order so that the order is ready for pick-up by the customer-selected fulfillment window.

In one embodiment, after the order has been transmitted to order assembly server 24, a customer may be enabled 216 to add one or more additional consumer goods or services to the same order pick-up window or time slot selected earlier in step 208. For example, order server 16 may display one or more pending orders 112 that have previously been placed by the customer, but have not yet been picked up by the customer. The order server 16 may allow the customer to associate additional consumer goods or services selected by the customer with the pending order so that the additional goods or services are available for pick-up at the fulfillment window or time slot associated with the pending order. The customer may submit a request to add the goods or services to the order or fulfillment window.

In one embodiment, order forecasting server 33 may estimate an amount of time needed to fulfill the order of the additional goods or services and may determine whether system 10 can fulfill the additional order by the fulfillment window. If order forecasting server 33 determines that the additional goods or services can be added without compromising the fulfillment window, order forecasting server 33 may transmit a notification to order assembly server 24. Order assembly server 24 may then coordinate with appointment server 31 to add the new order to the workflow of the store employee who is assembling the pending order. In some embodiments, the new or additional order may be flagged or otherwise identified as an express order such that the order is treated in an expedited manner. Accordingly, in one embodiment, a notification message is transmitted from order assembly server 24 to assembler device 38 of the store employee to notify the employee that the additional item or service needs to be added to the original fulfillment window. The original (pending) order and the additional order may be assigned separate order IDs, for example, and appointment server 31 and/or order assembly server 24 may associate or link the original order ID with the additional order ID to ensure that both orders are fulfilled by the same store employee for the same fulfillment window.

Order server 16 may determine 218 whether a second order cutoff time has been reached. For example, order server 16 may set a final cutoff time of 30 minutes before the fulfillment window for preventing new orders (i.e., additional goods or services) from being added to the fulfillment window. If the second order cutoff time has been reached, the customer is prevented 220 from adding more goods or services to the fulfillment window.

The store employee may complete 222 the assembly or fulfillment of the pending order and any additional orders that have been added to the fulfillment window in order to allow the customer to pick up or otherwise receive 224 the ordered goods or to receive the ordered services at the selected fulfillment window. Once the order or orders are received 224 by the customer, method 200 ends.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A system comprising:
one or more processors; and
one or more non-transitory computer-readable media storing computing instructions that, when executed on the one or more processors, cause the one or more processors to perform functions comprising:
receiving, from a customer device at a first time, an online order of at least one of a plurality of items for a customer, wherein the online order comprises (i) a customer identification for the customer and (ii) a first order identification for the online order;
receiving, from the customer device, a selection of a pick-up time for retrieval of the online order at a store;
receiving, at a second time after the first time, an additional order for the customer comprising (i) one or more additional items from the plurality of items, (ii) the customer identification, and (iii) a second order identification being different than the first order identification;
linking the second order identification for the additional order to the first order identification for the online order based on the customer identification to create a combined order; and
when the additional order is received before a cutoff time for the pick-up time, sending instructions to an automatic inventory retrieval system with an integrated assembler device comprising one or more robots, wherein each robot of the one or more robots is configured to (1) read respective identifiers for at least one item of the plurality of items of the online order and for the one or more additional items of the additional order of the combined order, (2) identify, by scanning a sticker label affixed to an item available in a facility, that the item belongs to either the online order or the additional order of the combined order, (3) retrieve the at least one of the plurality of items and the one or more additional items of the combined order from the facility, and (4) place the at least one of the plurality of items and the one or more additional items of the combined order in a designated location to facilitate assembly of the combined order.

2. The system of claim 1, wherein the computing instructions, when executed on the one or more processors, further cause the one or more processors to perform a function comprising:
before linking the second order identification for the additional order to the first order identification for the online order, determining that the one or more additional items can be assembled along with the online order by the pick-up time, as selected, based on an estimated amount of time needed to assemble the one or more additional items.

3. The system of claim 1, wherein the computing instructions, when executed on the one or more processors, further cause the one or more processors to perform functions comprising:
before sending the instructions to the automatic inventory retrieval system:
estimating an amount of time needed to assemble the one or more additional items; and
determining, based on the amount of time, that the automatic inventory retrieval system has capacity to assemble the one or more additional items by the pick-up time of the online order, as selected and combined.

4. The system of claim 1, wherein a number and a type of the one or more robots depend on a layout of a respective facility and a manner in which items available at the respective facility are stored.

5. The system of claim 1, wherein the computing instructions, when executed on the one or more processors, further cause the one or more processors to perform functions comprising:
before sending the instructions to the automatic inventory retrieval system:
estimating, by an order forecasting server, an amount of time for the one or more robots to assemble the additional order of the combined order; and
sending, by the order forecasting server, the amount of time to an appointment server.

6. The system of claim 1, wherein the computing instructions, when executed on the one or more processors, further cause the one or more processors to perform functions comprising:
before sending the instructions to the automatic inventory retrieval system:
determining, by an appointment server, whether the one or more robots have capacity to fulfill the additional order of the combined order by the pick-up time; and
sending, by the appointment server, a notification to an order server regarding whether the one or more robots have capacity to assemble the additional order of the combined order by the pick-up time.

7. The system of claim 6, wherein the computing instructions, when executed on the one or more processors, further cause the one or more processors to perform functions comprising:
after sending, by the appointment server, the notification to the order server and after sending the instructions to the automatic inventory retrieval system with the integrated assembler device:
enabling, by the order server, the customer to check out with the additional order of the combined order for pick-up at the pick-up time upon receipt of the notification from the appointment server that the one or more robots have the capacity to assemble the additional order of the combined order by the pick-up time.

8. The system of claim 6, wherein the computing instructions, when executed on the one or more processors, further cause the one or more processors to perform functions comprising:
after sending, by the appointment server, the notification to the order server and after sending the instructions to the automatic inventory retrieval system:
preventing, by the order server, the customer from checking out with the additional order of the combined order for pick-up at the pick-up time upon receipt of the notification from the appointment server that the one or more robots do not have the capacity to assemble the additional order of the combined order by the pick-up time.

9. The system of claim 1, wherein the one or more additional items from the plurality of items of the combined order comprise a service provided at the store.

10. The system of claim 9, wherein the computing instructions, when executed on the one or more processors, further cause the one or more processors to perform a function comprising:

automatically reserving an appointment for the service to be performed at the pick-up time at the store upon a determination that the service can be performed by a time of the pick-up time at the store.

11. A method being implemented via execution of computing instructions configured to run on one or more processors and stored at one or more non-transitory computer-readable media, the method comprising:

receiving, from a customer device at a first time, an online order of at least one of a plurality of items for a customer, wherein the online order comprises (i) a customer identification for the customer and (ii) a first order identification for the online order;

receiving, from the customer device, a selection of a pick-up time for retrieval of the online order at a store;

receiving, at a second time after the first time, an additional order for the customer comprising (i) one or more additional items from the plurality of items, (ii) the customer identification, and (iii) a second order identification being different than the first order identification;

linking the second order identification for the additional order to the first order identification for the online order based on the customer identification to create a combined order; and when the additional order is received before a cutoff time for the pick-up time, sending instructions to an automatic inventory retrieval system with an integrated assembler device comprising one or more robots, wherein each robot of the one or more robots is configured to (1) read respective identifiers for at least one item of the plurality of items of the online order and for the one or more additional items of the additional order of the combined order, (2) identify, by scanning a sticker label affixed to an item available in a facility, that the item belongs to either the online order or the additional order of the combined order, (3) retrieve the at least one of the plurality of items and the one or more additional items of the combined order from the facility, and (4) place the at least one of the plurality of items and the one or more additional items of the combined order in a designated location to facilitate assembly of the combined order.

12. The method of claim 11, further comprising:
before linking the second order identification for the additional order to the first order identification for the online order, determining that the one or more additional items can be assembled along with the online order by the pick-up time, as selected, based on an estimated amount of time needed to assemble the one or more additional items.

13. The method of claim 11, further comprising:
before sending the instructions to the automatic inventory retrieval system:
estimating an amount of time needed to assemble the one or more additional items; and
determining, based on the amount of time, that the automatic inventory retrieval system has capacity to assemble the one or more additional items by the pick-up time of the online order, as selected and combined.

14. The method of claim 11, wherein a number and a type of the one or more robots depend on a layout of a respective facility and a manner in which items available at the respective facility are stored.

15. The method of claim 11, further comprising:
before sending the instructions to the automatic inventory retrieval system:
estimating, by an order forecasting server, an amount of time for the one or more robots to assemble the additional order of the combined order; and
sending, by the order forecasting server, the amount of time to an appointment server.

16. The method of claim 11, further comprising:
before sending the instructions to the automatic inventory retrieval system:
determining, by an appointment server, whether the one or more robots have capacity to fulfill the additional order of the combined order by the pick-up time; and
sending, by the appointment server, a notification to an order server regarding whether the one or more robots have capacity to assemble the additional order of the combined order by the pick-up time.

17. The method of claim 16, further comprising:
after sending, by the appointment server, the notification to the order server and after sending the instructions to the automatic inventory retrieval system with the integrated assembler device:
enabling, by the order server, the customer to check out with the additional order of the combined order for pick-up at the pick-up time upon receipt of the notification from the appointment server that the one or more robots have the capacity to assemble the additional order of the combined order by the pick-up time.

18. The method of claim 16, further comprising:
after sending, by the appointment server, the notification to the order server and after sending the instructions to the automatic inventory retrieval system:
preventing, by the order server, the customer from checking out with the additional order of the combined order for pick-up at the pick-up time upon receipt of the notification from the appointment server that the one or more robots do not have the capacity to assemble the additional order of the combined order by the pick-up time.

19. The method of claim 11, wherein the one or more additional items from the plurality of items of the combined order comprise a service provided at the store.

20. The method of claim 19, further comprising:
automatically reserving an appointment for the service to be performed at the pick-up time at the store upon a determination that the service can be performed by a time of the pick-up time at the store.

* * * * *